Jan. 7, 1958 H. SCHACHET 2,818,898
VEGETABLE SLICERS
Filed Dec. 16, 1955 2 Sheets-Sheet 2
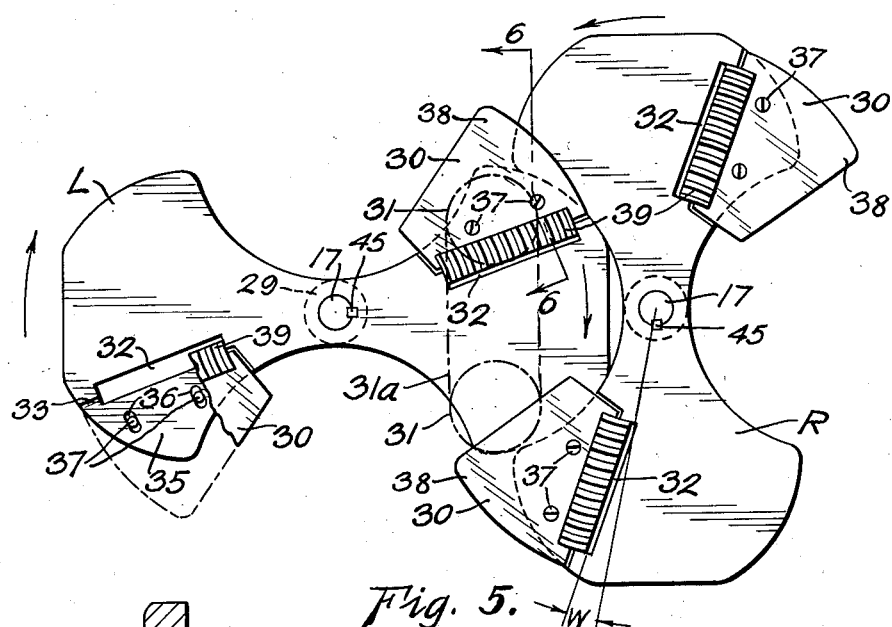
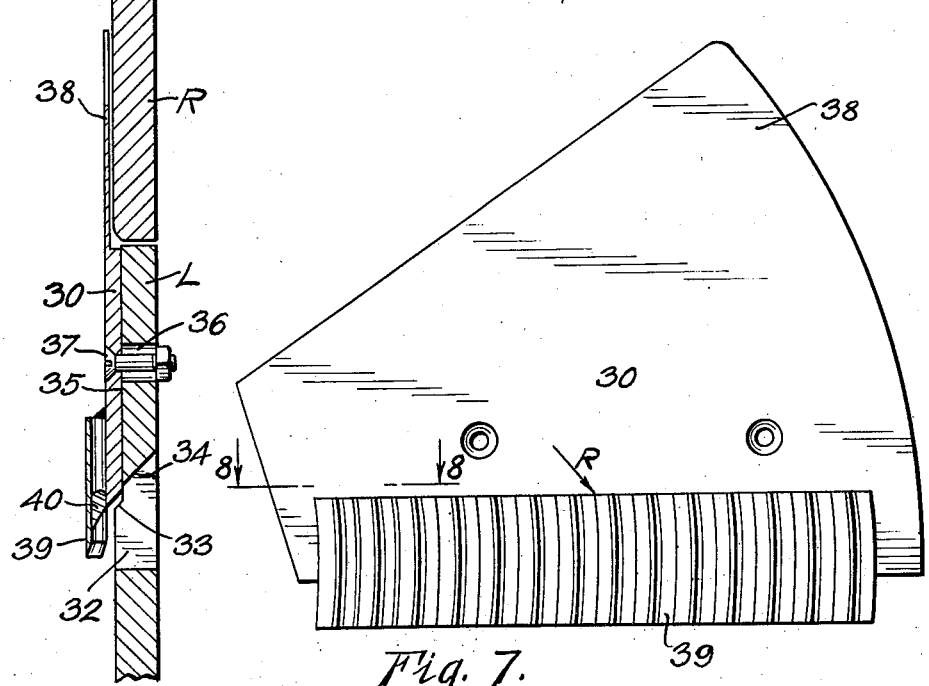
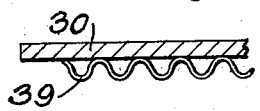
INVENTOR.
HYMAN SCHACHET
BY
ATTORNEYS

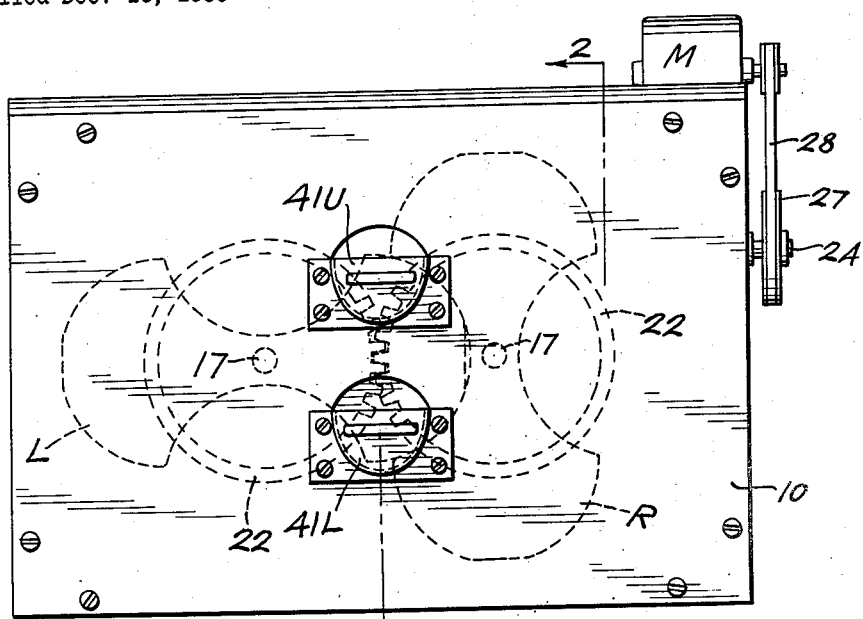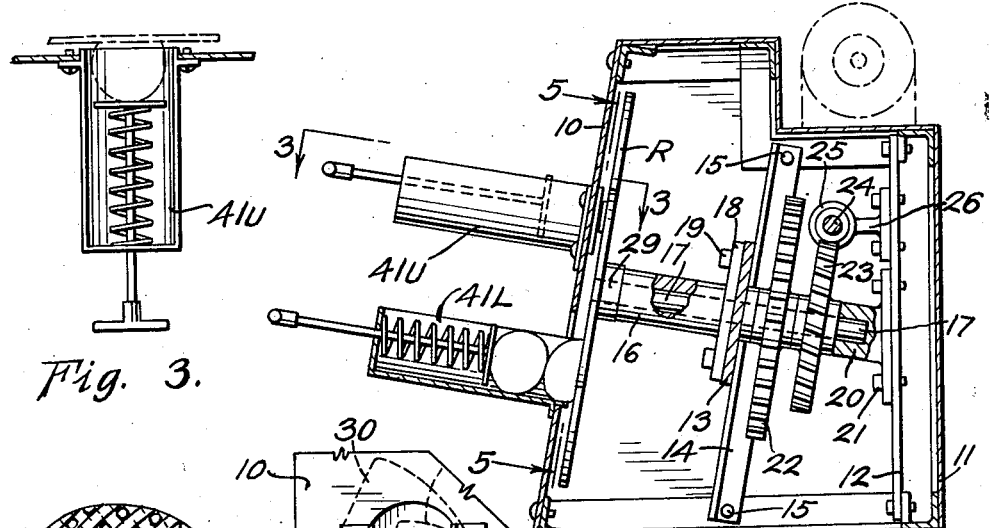

United States Patent Office 2,818,898
Patented Jan. 7, 1958

2,818,898

VEGETABLE SLICERS

Hyman Schachet, Denver, Colo.

Application December 16, 1955, Serial No. 553,630

5 Claims. (Cl. 146—78)

This invention relates to improvements in vegetable slicers of the type employed principally in the manufacture of potato chips.

It is the object of this invention to produce a machine of increased capacity and of such a design that it will cut chips corrugated on both sides in such a way that the corrugations cross forming chips having an ornamental appearance.

Another object is to produce a machine that will produce chips with such deep corrugations that they intersect and leave rows of openings.

The above and other objects to which attention may be directed hereinafter or which may become apparent as the description proceeds are attained by means of a construction and an arrangement of parts that will now be described in detail, for which purpose reference will be had to the accompanying drawings in which the invention has been illustrated, and in which:

Figure 1 is a front elevational view looking towards the right in Figure 2;

Figure 2 is a vertical section taken on line 2—2 Figure 1;

Figure 3 is a top plan view of the upper feed trough;

Figure 4 is a top plan view of one of the potato chips;

Figure 5 is an enlarged plan view, looking through plane 5—5 Figure 2 and shows the relative positions of the slicing disks at the time of the upper cut;

Figure 6 is a further enlarged section taken on line 6—6 Figure 5;

Figure 7 is an enlarged top plan view of the knife carrying abutment plate to which the corrugated slicing knife is attached;

Figure 8 is a fragmentary section taken on line 8—8 Figure 7; and,

Figure 9 is a sectional view showing a modification.

Referring now to the drawing, reference numeral 10 designates the removable front plate of the housing in which the parts are enclosed whose construction will not be described in detail. Positioned a short distance to the front of the rear wall 11 is a flat bar 12 that is attached at its upper and lower ends to the top and bottom frame members of the housing as shown in Figure 2. Positioned forwardly of plate 12 is a heavy steel plate 13 which is attached at its ends to angle bars 14 which in turn are attached at their upper and lower ends to the housing frame by means of bolts or rivets 15. Bars 14 are inclined so as to bring the plane of plate 13 into parallel relation with plate 10. Attached to plate 13 are two elongated tubular bearings 16, one for each of shafts 17, of which there are two as shown in Figures 1 and 5. Bearings 16 are provided with flanges 18 and are attached to plate 13 by bolts 19. Shafts 17 have their rear or inner ends journaled in bearings 20 that are attached to plate 12 by bolts 21 as shown in Figure 2. Identical spur gears 22 are attached to the shafts in the position shown in Figure 2. The shaft that is nearest to the right in Figure 1 carries a worm gear 23. A shaft 24 carrying a worm 25 is mounted for rotation in spaced bearings 26, only one of which is shown in the drawing, which positions the shaft so as to bring the worm into proper operative position relative to the worm wheel. Shaft 24 projects out beyond the right hand end of the housing as shown in Figure 1 and carries a V-type pulley 27 that is driven from the motor M by means of a belt 28. Suitable current supply and control switch for the motor must, of course, be provided but have not been shown. When the motor functions the slicing disks R and L which are attached to the front ends of shafts 17 will turn at the same angular speed but in opposite directions as shown by arrows in Figure 5.

Reference will now be had in particular to Figures 5 to 8 in which the construction of the slicing disks and the manner in which they cooperate have been shown. Each disk has a hub 29 that receives the front end of a shaft 17 and is held from rotation by suitable means, a key 45 has been shown. The disks are shaped as shown in Figure 5 and are roughly of hour glass shape. Each disk terminates in identical paddle-like ends and resemble slicing disks now in use. As stated above, applicant's principal object is to increase the capacity of similar slicer machines and at the same time to obtain chips having a greater "criss-cross" than has heretofore been attained. In this regard attention is called to U. S. Patent 2,024,353 and to Figure 12 thereof, and also to U. S. Patent 2,567,248, the latter in Figure 5 shows a potato chip having a more noticeable "criss-cross" due to the fact that the cutting takes place some distance above the axes of rotation. Applicant, as shown in Figures 1 and 2, feeds the potato or other vegetable both above and below the level of shafts 17 which doubles the capacity as compared to similar machines that feed on the level of the disk rotating shafts. Experiments have shown that the slicing cannot take place any appreciable distance above or below the level of the centers of disk rotation unless the rotating disks are modified to form a bridge or abutment for the potato which will prevent it from projecting into or through the gap between the disks. Another essential is that the slicing knives must be near the following edge of the "paddle" portions, also, following the knives there must be a plate 30 that serves as a bridge or an abutment for the potato or other vegetable during the time that there is a considerable open space between the adjacent edges of the disks. Applicant has constructed the slicing disks as shown in Figure 5. The left hand disk rotates clockwise and the right hand disk counterclockwise. In Figure 5 the position of the feeds above and below the horizontal line joining the disk axes have been designated by broken line circles 31 and these are positioned so as to be similarly intersected by the two slicing knives. Since there are two vertically spaced feed positions the slicer knives will cut two chips on each down stroke and, therefore, it will have twice the capacity of another slicer of similar construction but having a single feed point positioned on the same level as the disk shafts. Each of the two disks have two elongated openings 32 fairly close to the following edges and associated with them are slicer knives and bridge plates that will now be described.

Referring principally to Figures 6, 7 and 8, it will be seen that the upper surface of the disk has been reduced in thickness from line 33 to the following edge. It will also be noted that the leading wall of opening 32 is inclined as indicated by numeral 34. The depressed area 35 of the disk has two radially elongated holes 36. Plate 30 is provided with two stove bolts 37 by means of which it is adjustably secured to the disk. The portion 38 of plate 30 that laps the other disk and bridge the gap must be made thinner to compensate for the reduced thickness of area 35 (Figure 6). A corrugated slicer blade 39 is soldered to plate 30 at 40, as shown in Figure 6.

Particular attention is directed to the fact that the slicer knife blades are parallel with the surface of the disk to which they are attached and the teeth have a curvature corresponding to the center corrugation, as indicated by arrow R in Figure 7. Since the curvatures of the corrugations approach quite closely to that of the circle in which they travel they will not tear the vegetable as they would if they were straight. The thickness of the chips can be varied by placing shims of different thickness between plate 30 and the depressed surface on which it rests. From Figure 5 it will be seen that the cutting edges of the knives are not radial but deviate from the radius by an angle *w* which can be selected so as to give the best result.

It will be seen from Figure 5 that each complete revolution of a cutter disk cuts four chips, and to obtain this desired operation there must be two vertically spaced feed points and an abutment plate that projects from the following edge of the disk to which it is attached and forms a bridge or abutment for the vegetable until the other disk is in position to do so. The feed points should be as far above and below the center line of the disks so as to get the largest practical criss-cross angle.

An examination of Figures 1 and 5 show that the slicing knives on the two disks cover a common area that includes, not only the areas indicated by the dotted circles 31 in Figure 5 but the area included between the two broken lines 31*a* which are tangent to circles 31. It is clear, therefore, that the knives will slice any potatoes positioned within the areas defined by the broken lines in Figure 5. The slices cut from a potato positioned in the areas defined by the circles 31 will have the greatest angular criss-cross and potatoes positioned on a line joining the axes of the disks will have the minimum criss-cross angle. It follows from the above that instead of employing two feed troughs like those shown in Figures 2 and 3 indicated by reference numerals 41U and 41L one deep trough like that shown in Figure 9 and designated by reference numeral 42 can replace the two. By having a feed trough like that shown in Figure 9 several potatoes can be one over the other and each knife blade will cut a chip from all at each down stroke and in this way the capacity is greatly increased over slicers that have a single feed point whether or not that is positioned on the line joining the centers of disk rotation.

Applicant employs corrugated slicing knives and since they follow a circular path the corrugations are curved about the centers of disk rotation. Theoretically, each corrugation should have a different radius of curvature. It has been found that if the corrugation at the middle point of the knife which has been designated by R in Figure 7, has the correct curvature the others may have the same curvature without causing any tearing of the potato as would occur if the corrugations were perpendicular to the radius.

As pointed out above the reason why the potatoes or other vegetable can be fed at points spaced as far above or below the level of the disk centers is that the large gap that otherwise would occur at this point is bridged by plates 30. Line 43 shown in Figure 8 represents a line joining the centers of disk rotation. Figure 4 shows the appearance of a chip cut at the maximum distance above or below line 43.

What is claimed as new is:

1. A vegetable slicer having a pair of slicing disks mounted for coplanar rotation about spaced parallel axes, said disks being of the type having opposed inwardly arcuate sides terminating in paddle shaped ends, oppositely arranged transversely corrugated slicer knives near the ends of the paddles and adjacent the following edges thereof, the loci of the knives coinciding where they cross a line joining the centers of disk rotation; means for feeding vegetables to be sliced into the paths of the slicer knives at symmetrically positioned points above and below the level of the axes of rotation, each disk having a bridge plate projecting rearwardly from each slicer knife positioned and arranged to overlap the leading edge of the following disk and form a support for the vegetable until the paddle surface of said following disk crosses the feed point.

2. A vegetable slicer in accordance with claim 1 in which the knife blades are positioned entirely on the outer surfaces of the slicing disks.

3. A vegetable slicer in accordance with claim 1 in which the cutting edges of the knives form acute angles with disk radii contacting one end of the knife.

4. A vegetable slicer in accordance with claim 2 in which the corrugations of the knives are arcuate with their centers of curvature adjacent the center of disk rotation.

5. A vegetable slicer in accordance with claim 4 in which the cutting edges of the knives form acute angles with radii contacting one end of the knives.

References Cited in the file of this patent

UNITED STATES PATENTS

| | | |
|---|---|---|
| 1,972,586 | Etter et al. | Sept. 4, 1934 |
| 2,024,353 | Goodman | Dec. 17, 1935 |
| 2,567,248 | Stahmer | Sept. 11, 1951 |

FOREIGN PATENTS

| | | |
|---|---|---|
| 593,940 | Germany | Mar. 9, 1934 |
| 410,926 | Great Britain | May 31, 1934 |
| 476,969 | Great Britain | Dec. 20, 1937 |